Feb. 16, 1932.  L. W. LUELLEN  1,845,302
SYSTEM OF VENDING RADIO ENERGY
Original Filed Nov. 24, 1923    7 Sheets-Sheet 1
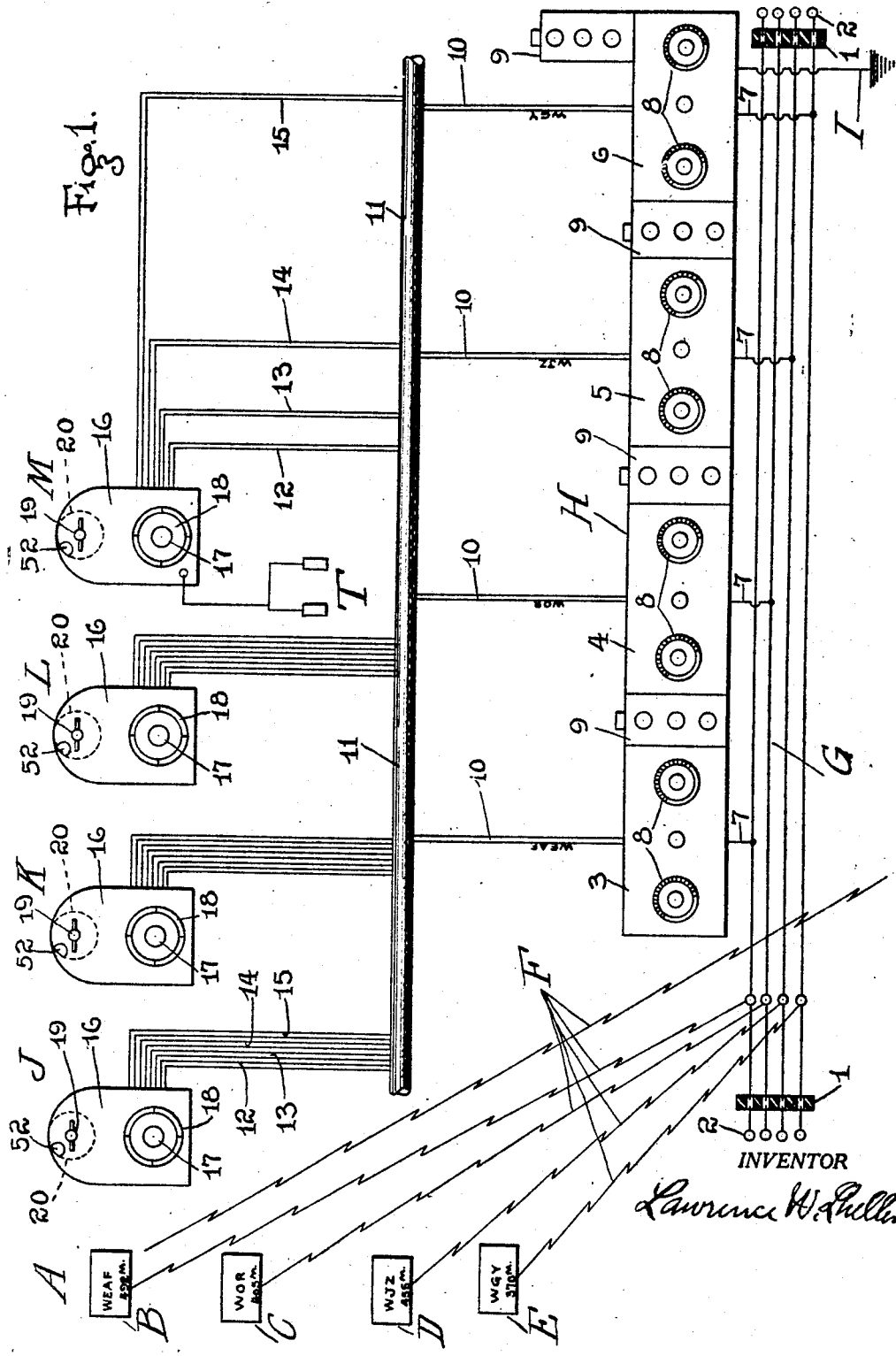

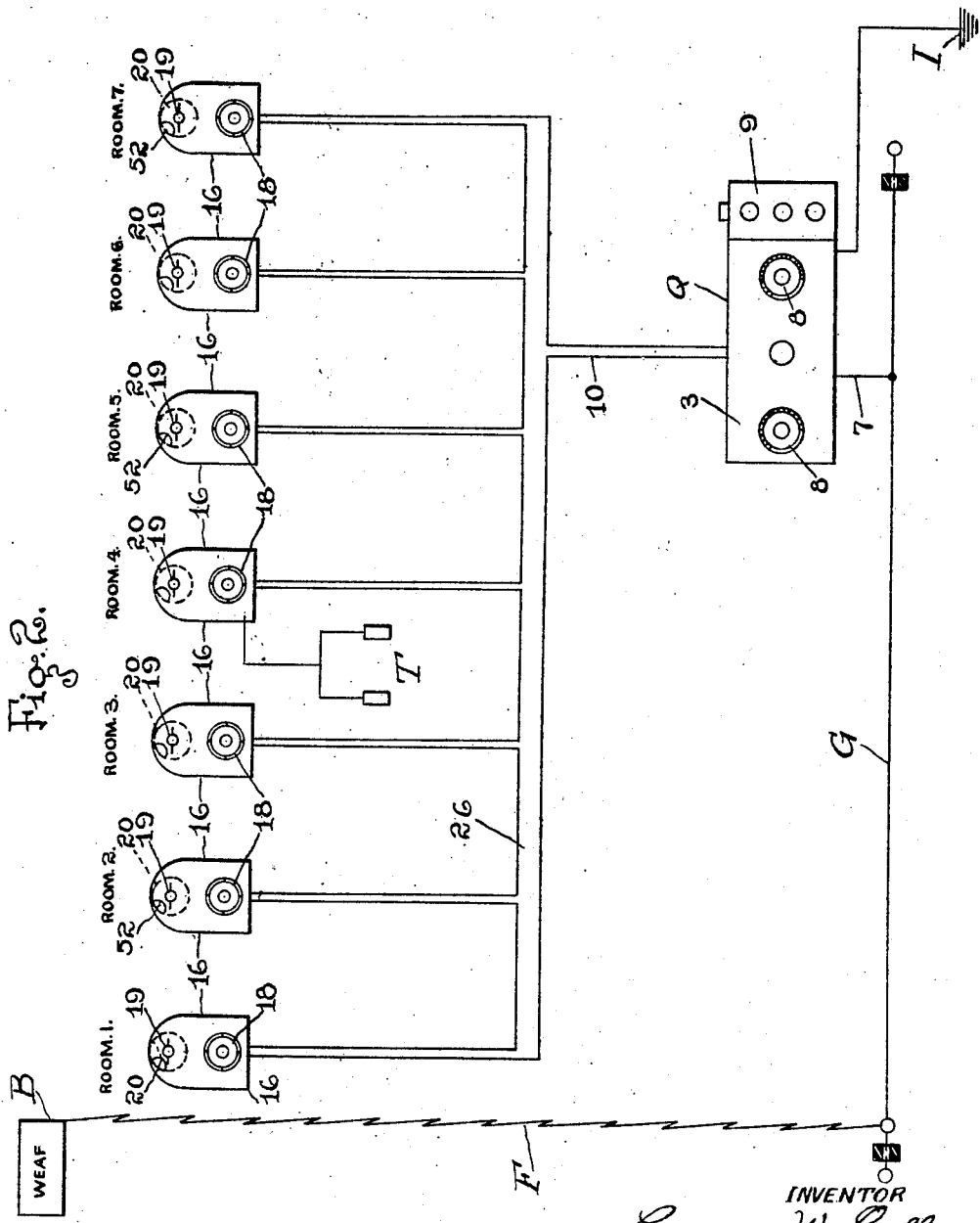

Feb. 16, 1932.   L. W. LUELLEN   1,845,302
SYSTEM OF VENDING RADIO ENERGY
Original Filed Nov. 24, 1923   7 Sheets-Sheet 3
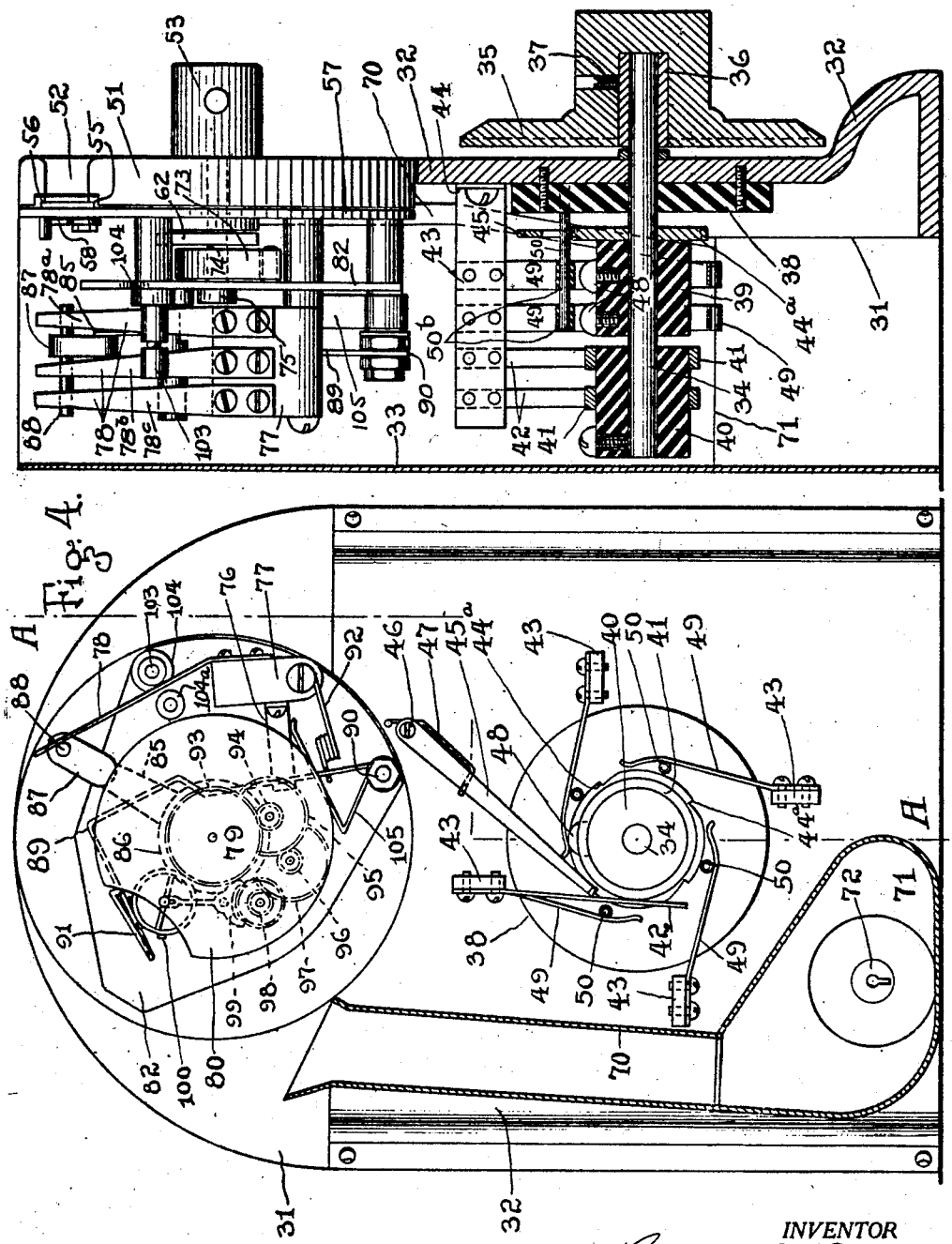
INVENTOR
Lawrence W. Luellen Feb. 16, 1932.    L. W. LUELLEN    1,845,302
SYSTEM OF VENDING RADIO ENERGY
Original Filed Nov. 24, 1923    7 Sheets-Sheet 4
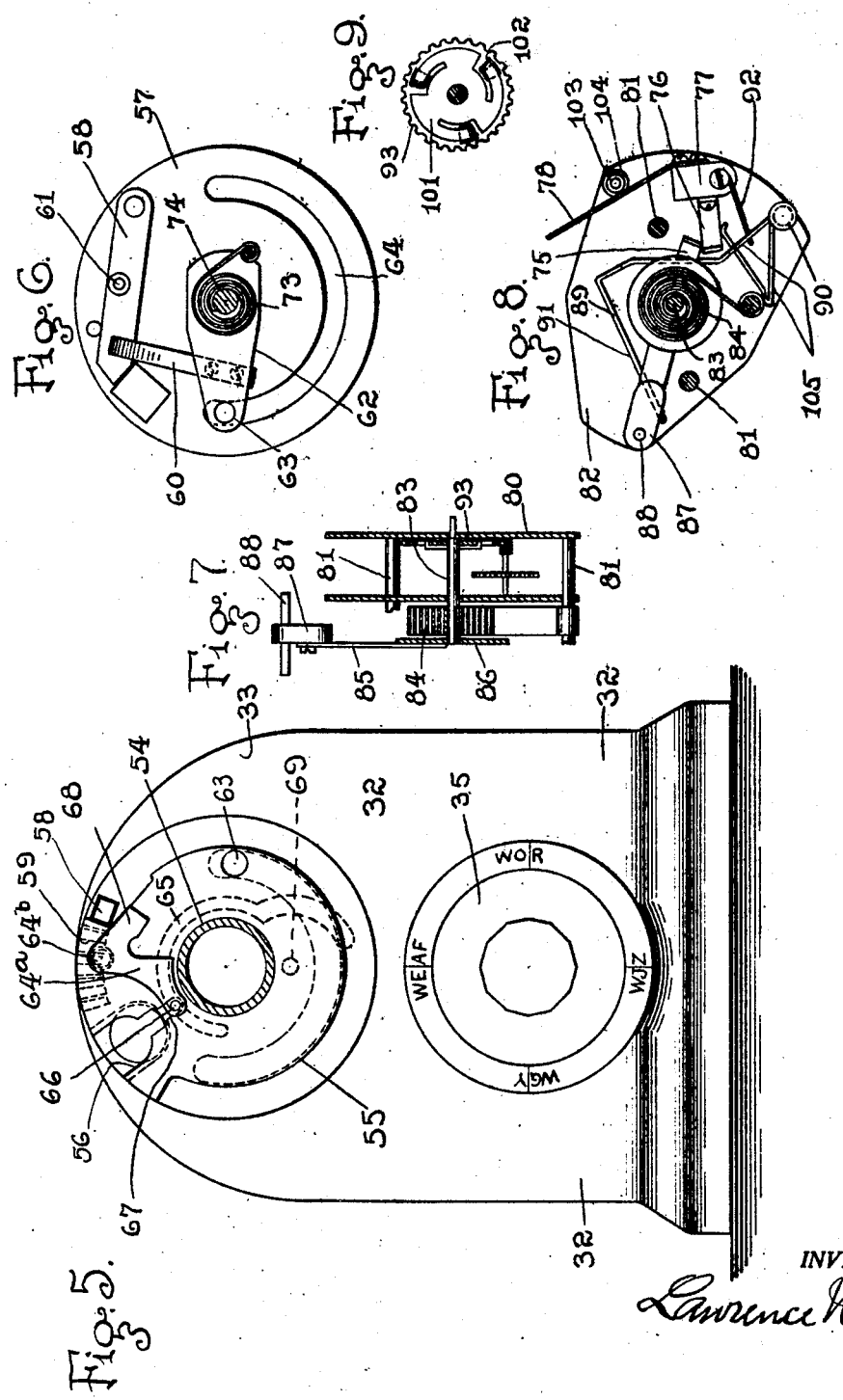
INVENTOR
Lawrence W Luellen

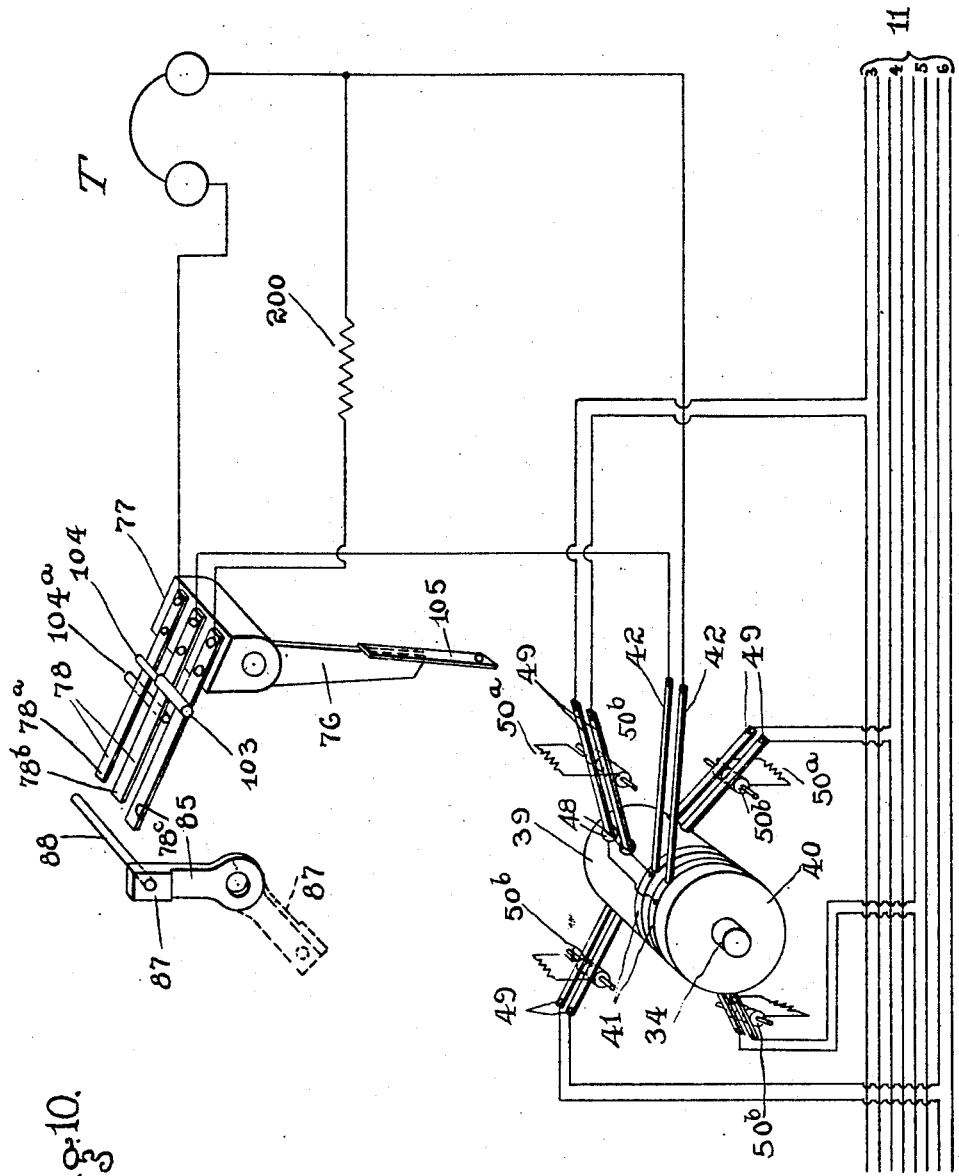

Feb. 16, 1932.  L. W. LUELLEN  1,845,302
SYSTEM OF VENDING RADIO ENERGY
Original Filed Nov. 24, 1923   7 Sheets-Sheet 6
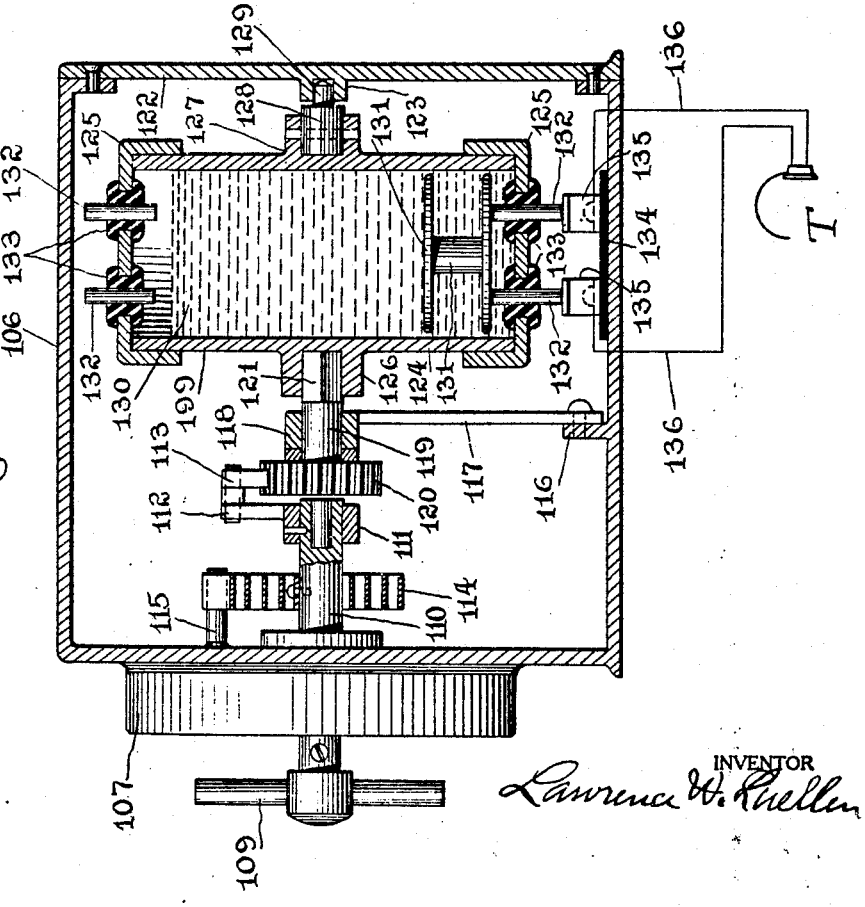

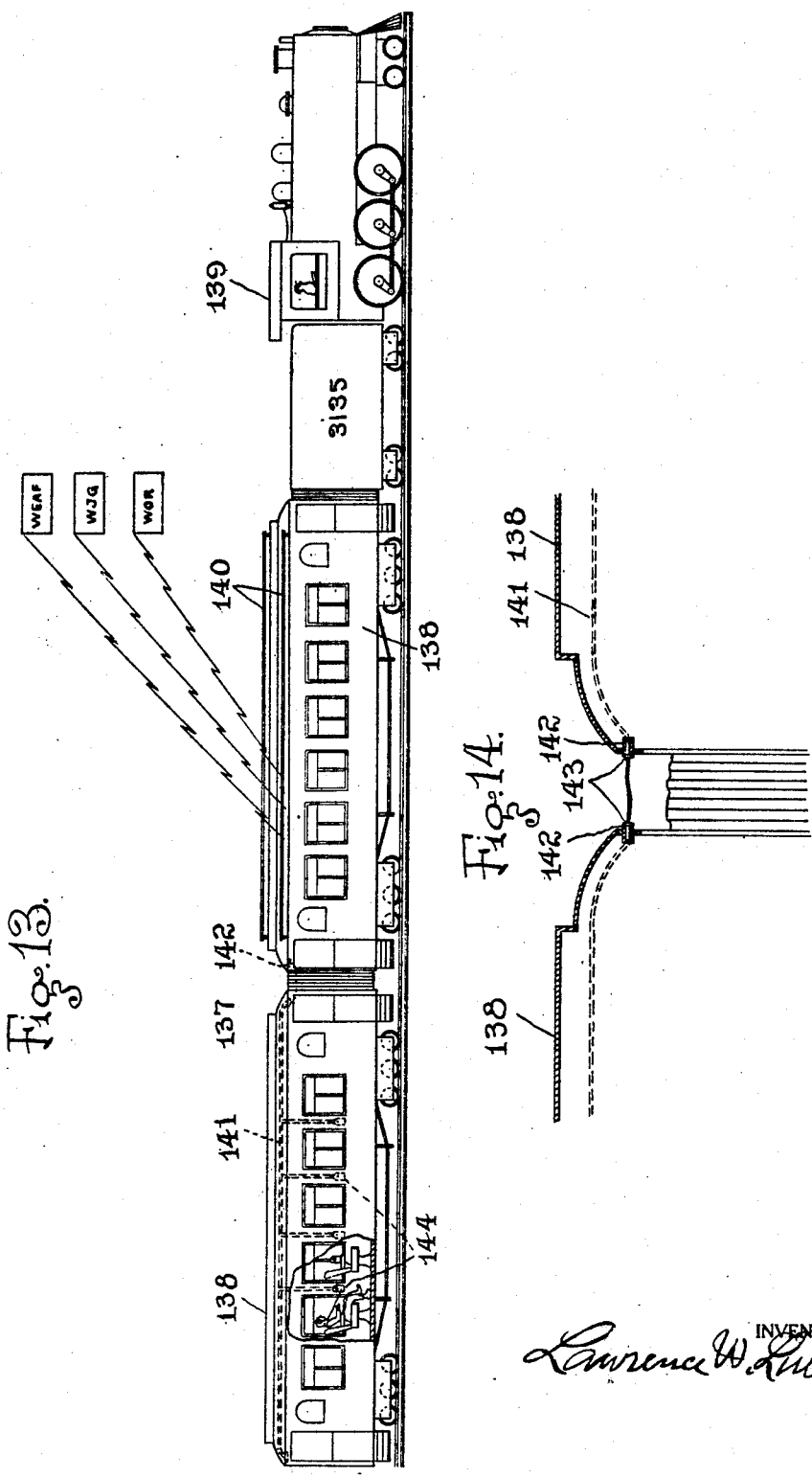
Feb. 16, 1932. L. W. LUELLEN 1,845,302
SYSTEM OF VENDING RADIO ENERGY
Original Filed Nov. 24, 1923   7 Sheets-Sheet 7

Patented Feb. 16, 1932

1,845,302

UNITED STATES PATENT OFFICE

LAWRENCE W. LUELLEN, OF MOUNTAIN LAKES, NEW JERSEY, ASSIGNOR TO RADIO CORPORATION OF AMERICA, OF NEW YORK, N. Y., A CORPORATION OF DELAWARE

SYSTEM OF VENDING RADIO ENERGY

Substitute for application Serial No. 676,755, filed November 24, 1923. This application filed April 26, 1927. Serial No. 186,798.

This invention relates to a system or method of vending radio energy or messages and has particular reference to apparatus and associated means for receiving radio from a series or plurality of broadcasting stations through a receiving set or sets directly connected with one or more points or sub-stations which may be operative and controlled by coin and time actuated means; in which case it is called radio vendor.

This application is substituted for application Serial No. 676,755, filed November 24, 1923, by this applicant.

One object of the invention is to produce a unit from radio energy or messages that has been broadcast, which unit may be commercialized or sold.

A further object of the invention is to provide means whereby private families or the general public may be enabled to enjoy the benefits of radio energy or messages without the necessity of entailing the immediate cost of an expensive radio receiving set or unit, and further, in case of the public, the expenditure and time now necessary in gaining experience in handling and operating such radio set or unit, but that they may be able, at a nominal or partial payment cost, to enjoy, without previous experience, broadcast radio energy or messages sent out by various broadcasting stations.

The invention as hereinafter described provides a further and more extensive and far reaching object in that it will stimulate interest in radio by the general public to such an extent that broadcasting of news, markets, reports, information, sports, entertainment and the like, every day on certain hours, will be sought and received at a nominal cost by those listening in, hours before it is now possible to have them known by the usual processes of printing and other manners of distribution.

Another object of the invention is to distribute and/or sell commercialized portions or units of radio energy or messages by providing a suitable antenna, antennæ or other means placed so as to receive radio waves that may be transmitted from one or more points of broadcasting, and by connecting said antenna or antennæ by the usual means to a receiving set or sets which are provided with means for tuning to the divers wavelengths of one, two, three, four or more predetermined broadcasting stations. Said receiving sets may have associated therewith radio and/or audio frequency amplifying means, whereby electrical energies may be projected therefrom over suitable electric circuits to one or more vendors which may be placed within or at remote points from the receiving set or sets, said radio vendor or vendors being provided with means whereby each may be connected in with or switched to one or more broadcasting stations during communication with the receiving set or sets.

Each of said radio vendors may, for the vending of radio, be placed on a table or in each one of a multiplicity of rooms in a hotel, office building, ship, railroad car, or other structure. The radio vendor may be in the form of a suitable instrument, provided with ear-sets, loud-speakers or other delivering means. The radio controlling mechanism has associated therewith means for selecting one or more broadcasting or transmitting stations, together with apparatus for connecting said radio vendor to the transmitting stations with which said receiving set or sets are in communication. Each radio vendor is actuated by coin controlled, time operated mechanism for making and breaking electrical connections to vend the radio energy or messages.

The apparatus as employed in one embodiment of the invention as hereinafter set forth, constitutes a departure from the general field of radio and wireless utility, and provides a new and novel plan of connecting, in unit formation, any desired number of radio receiving sets or means and disposing of or otherwise vending units of energy or messages received thereover, for commercial purposes and monetary gain. It further reduces to practice an innovation in addition to the many known uses of radio or wireless, provides a new, convenient and economical form of entertainment for those who are devotees of its wonderful phenomena, and supplies a field of enterprise not surpasses by the reduction to commercial use of the telephone and like systems and methods of communication.

In the following, I describe the essential embodiments of the invention but do not limit myself to the constructions shown, the particular features of my invention being specifically set forth hereinafter in the claims.

In the drawings forming part hereof, Fig. 1 is a diagrammatic illustration of my system of radio distribution, including a plurality of receiving sets, and the means of communication therefrom to a plurality of points of utility or radio vendors, the latter means constituting the terminus or point of vending radio energy in accordance with a method of controlling electrical contacts;

Fig. 2 is a diagrammatic illustration of a modified arrangement for vending units of radio energy or messages by means of a single distribution system wherein a receiving set gathers radio from a single broadcasting station, and distributes energy therefrom to a multiplicity of points or radio vendors, the latter being actuated by coin and time controlled mechanism for vending the radio for commercial purposes;

Fig. 3 is a rear elevation of the instrument utilized as the radio vendor, showing the instrument with its rear housing removed to more clearly illustrate the operative parts of the invention;

Fig. 4 is a vertical, partially sectional view on line A—A of the structure shown in Fig. 3 of the drawings, illustrating the radio control mechanism and the coin and time controlled means of the radio vendor, except that the conventional clock parts which otherwise would appear at the upper left of the figure have been omitted;

Fig. 5 is a front elevation of the radio vendor showing the casing thereof broken away to more clearly illustrate the coin controlled actuating means, and the selective audio controlling dial;

Fig. 6 is a rear elevation of the coin control mechanism with means for resetting the same;

Fig. 7 is a vertical, sectional view, looking from the left in Figs. 3 and 8, of the clock train or time actuating mechanism for maintaining the sub-station, audio receiving unit or instrument in communication with the main radio energy receiving station, during a predetermined period of time.

Fig. 8 is a rear elevation of the mechanism for controlling the duration of time in which the radio vendor is in operative delivery position, showing the detail means of shutting off the instrument from delivering the relatively constant communication of the receiving set or sets.

Fig. 9 is a detail face elevation looking toward the rear of the vendor of the winding or reset escapement gear forming part of the mechanism for controlling the duration of the time controlled mechanism;

Fig. 10 of the drawings is a diagrammatic illustration of the electrical parts of the radio vendor, showing the revolving switch, telephone, shunting mechanism and the relative wiring employed to connect each respective unit in the general receiving circuit;

Fig. 11 is a vertical sectional view of a modified form of radio vendor instrument to be used alone with a receiving set for renting or partial payment plan, wherein is shown a diversified form of time control mechanism for association with coin actuating mechanism;

Fig. 12 is a front elevation of the modified type of structure shown in Fig. 11;

Fig. 13 is a diagrammatical elevation of a railroad train illustrating the adaptation thereto of the radio broadcast vending units and of suitable antenna means therefor; and Fig. 14 is a longitudinal sectional view of the respective ends of coaches included in a coupled train and illustrating the means of coupling or connecting the lead wire connection from the antenna means to the respective radio energy vending units.

Similar reference numerals and characters indicate like parts throughout the respective views forming part of the application.

In the drawings and referring particularly to Fig. 1 thereof A designates a series of radio broadcasting stations, having comprised therein specific stations B—C—D and E and designated respectively (WEAF)—(WOR)—(WJZ) and (WGY) capable of transmitting energy at divers wave-lengths such as (WEAF) at 492 meters, (WOR) at 405 meters (WJZ) at 455 meters, and (WGY) at 370 meters, within a given zone. For the purposes of illustration there is shown imaginary flash lines F to designate the impulse of the wireless waves as transmitted by the respective broadcasting stations B—C—D and E to a suitable antenna or antennæ G arranged in unit formation, though not necessarily so arranged. Antennæ G are insulated from ground by means of insulators 1 supported by standards 2. H designates a main tuning in or receiving station and has embodied therein one or more receiving sets such as 3—4—5 and 6, each thereof being connected directly to antenna G by means of lead wire connections 7. Said stations 3—4—5 and 6 have associated therewith usual radio tuning mechanism controlled by means of tuning dials 8 and each unit thereof has connected therewith suitable amplifying members 9. Station H is connected to ground I to complete the radio circuit formation, though not necessarily so. Each unit in station H is subject to direct communication with any broadcasting station, for illustration, broadcasting stations B—C—D and E since the tuning mechanism is capable of varied impulse, and each unit 3—4—5 and 6 thereof has connected therewith wire connections 10 which may run through a direct circuit or a house transmitting cable 11 which is so arranged as to form a direct means of communication with one or more rooms in a hotel, or other like structure; said cable 11 thereof having connected therewith a series of wire connections 12—13—14 and 15, the latter of which are connected up with radio vendors J. K. L. and M., which comprise suitable instruments 16. Each radio vendor is provided with switch controlling mechanism 17, controlled by means of dials 18 provided with station designating means, and coin actuating mechanism 19 which operates a time controlled telephone shunting mechanism 20.

Referring to Fig. 2 of the drawings, a single broadcasting station B is employed and designated (WEAF) to transmit energy F to antenna G which is, in turn, connected by lead wire 7 to a single receiving station Q connected back to ground I. Said station Q comprises one usual receiving set 3 which may be provided with a radio and/or audio amplifying means 9 and tuning-in dials 8. Receiving set 3 is connected electrically, by means of conduit 10, to suitable house wiring 26 which latter may include a single form of wiring to one or more radio vendors 16 placed in the receiving set itself, adjacent thereto or in rooms 1—2—3—4—5—6—7, etc. in a hotel or other structure. Each radio vendor 16 comprises an instrument and may have associated therewith, a selecting dial 18, coin actuating mechanism 19 and time controlled shunting mechanism or means 20 for vending radio energy for a fixed duration and at a predetermined monetary charge. Each of the radio vendors employed is provided with suitable head sets T or a loud speaker, not shown.

The structure involved in the radio vendors, when adapted to be used in a plural combination such as show in J, K, L, and M, comprises specific apparatus where in the features thereof embody a casing 31 of a suitable design, form and size including a face section 32 and a rear housing 33, each of the sections thereof being provided with means for detachably assembling same. Casing 32 has mounted therein a bearing shaft 34 carrying at its outer end outside of casing 32 a dial 35 fastened to said shaft 34 by means of sleeve 36 and set screw 37. Shaft 34 finds bearing in disc 38 and carries at its front end inside of said casing 32 core 39 with contact points 48 mounted thereon, and adjacent thereto core 40 provided with contact rings 41 with which brushes 42 engage. Said brushes 42 are supported on bakelite blocks 43 which are mounted on brackets 44 fastened to casing 32, each brush 42 with its corresponding contact ring constituting a revolving contact means of communication in the radio vendors, J, K, L and M, depending upon the respective position of the dial and contact screws 48 which are brought into contact with one of the four pairs of brushes 49 which are connected respectively to the wires from the receiving sets 3—4—5 or 6, of station H, tuned in on and in communication with the relative broadcasting stations B, C, D and E. In Fig. 3, 44$^a$ indicates a ratchet mounted on shaft 34 and is engaged by pawl 45 mounted on pin 46 and held into notched contact thereon by means of spring 47, the object thereof being to provide means for selectively maintaining said contact points 48 in proper contact position to receive the designated commercial unit, energy, or message from the station indicated by the dial. Said brushes 42 are suitably connected electrically to a head-set or other instrument for delivery when the purchaser has inserted a coin and set in operation the radio vendor.

Referring to Fig. 4, core 39 has mounted therein contact points 48, which are respectively connected to contact rings 41 (see Fig. 10). Contact points 48 engage with one of the four pairs of brushes 49, each pair of brushes 49 being connected to the respective receiving set 3—4—5 or 6. Brushes 49 normally engage supporting contact posts 50, having mounted thereon metal rings 50$^b$ which are electrically connected together through resistance element 50$^a$ particularly shown and described in connection with Fig. 10 of the drawings, the object of said shunting resistance 50$^a$ being to provide a means for substituting a resistance in the distributing circuit equivalent to the resistance of the head set or loud speaker and related circuits in the vendor mechanism, so that when the selector on any one radio vendor is operated, there will result a minimum of interference at the other vendors, thus eliminating the necessity of readjusting the intensity of the signal in any particular channel of the distribution system when a change is made in the number of radio vendors in use on that particular channel. Also, the various resistances 50$^a$ provide a path for the signal current to pass from one brush 49 to the other brush of a set when the respective set is not in contact with the screw contacts 48. When any of the sets of brushes 49 come in contact with screw contacts 48 the brushes are lifted off of their respective supporting contact post 50 by the cam action of the screws 48. The brushes 49 which engage the contacts 48 in Fig. 3 are not shown in Figure 4 thereby enabling other parts to be shown more clearly.

Numeral 51 designates a coin receiving panel provided with a coin slot or aperture 52, and a suitable handle 53 is pivotally mounted therein and is provided with a collar 54 to which there is fastened in the manner set forth below an oscillating dial or coin plate 55 provided with a coin pocket 56. Said coin plate 55 rests normally against stationary disc 57, seen from the rear in Fig. 6, the latter being provided with a pawl 58 pinioned therein and held into contact with ratchet rack 59 on the rear face of said coin plate 55 by means of spring 60. Coin plate 55 is prevented from being turned by reason of the engagement of the pawl 58 in rack 59 but when the operation thereof is desired, a coin of a predetermined denominational value and size is inserted in slot 52, and drops into pocket 56; said coin on movement of handle 53 toward the right in Fig. 5 and the left in Fig. 6 engages a point on pin 61, mounted in pawl 58 extending through disc 57, forcing the pawl 58 out of engagement with rack 59 on said coin plate 55 and thus permitting the same to be turned a half rotation by arm 62 fastened on collar 54 and provided with pin 63 operative in slot 64 of the disc 57 and engaging an opening in coin plate 55, the coin plate 55 carrying the coin with it to a suitable point where it is discharged therefrom by means of cam lever 64ª pinioned at 64ᵇ in the coin plate itself. Said cam lever 64ª has an ejector pin 66 which traverses and is in engagement with cam groove 65 cut on the inside surface of panel 51, and therefore shown in broken lines in Fig. 5. When same is caused to rotate with coin carrying plate 55 the ejector pin 66, lying in the aperture 67 in said coin plate 55, carries said cam lever 64ª with it to a point where the arm of the cam lever 64ª contacts pin 69 in casing 51, causing said cam lever 64ª to move about 64ᵇ with its ejector pin and thrust the coin therefrom into a suitable coin chute 70, whence it is conveyed to a receptacle 71, access to which is had by means of a suitable locked tumbler plate 72. The set position, that is, the position for insertion of a coin, of the coin control mechanism is maintained by means of tension spring 73 mounted on the projecting shaft 74 of the actuating means therefor, the object of said spring 73 being to provide means for returning the coin control means to its normal position. Shaft 74 has mounted on its inner end an arm 75 resting normally against arm 76 which is attached to insulating block 77 having mounted thereon contact brushes 78 forming the contact leads for the attachment thereto of the wire connections from the energy distributing brushes 42 and the terminal connection of the head-phone set T.

Numeral 79 (Figs. 3 and 7) designates a clock train mechanism (not shown in Fig. 4) and comprises a frame 80 mounted on pins 81 fastened to starting plate 82 on which said contact brushes 78 and said insulating block 77 are pivotally mounted. Plate 82 (Fig. 4) is mounted by suitable means in parallel relation with discs 57 with the parts shown in Fig. 6 between them.

The pivoting of said insulating block 77 is to provide an automatic switch and a means whereby the head-set circuit is open except when said arm 75 is in its normal position, the object thereof being to provide means adapted to prevent the operation of the radio vendor without the complete return to normal position of the operating handle 53, otherwise the insertion of a single coin would maintain the radio vendor station in constant communication with the receiving set and permit the misuse or defrauding of the system.

Said clock train includes a main pinion shaft 83 mounted in line with shaft 74 and carrying torsion spring 84 and an actuating arm 85 mounted on disc 86 adjacent to the rear end of shaft 74, the arm 75 on the rear side of the plate 82 and the parts 85 and 77 being thereby brought adjacent to each other as shown in Fig. 8. The upper end of arm 85 has mounted thereon an insulator block 87 having mounted therein a laterally projecting insulating pin 88, the object of which is hereinafter described.

Numeral 89 indicates an operating arm or lever pivoted at one end at 90 (Fig. 3) and having its other end formed into a gooseneck 91, the normal position thereof being maintained by means of spring 92. Pinion shaft 83 has mounted thereon at the rear of the time mechanism (Figs. 3 and 9) a clutch gear 93 the torsion thereon being maintained by reason of the winding of main spring 84 and being arranged to drive pinion 94 which, in turn, actuates gear 95, thence pinion 96, gear 97, thence main pinion 98 to actuate an escapement drive 99 and in turn actuate the escapement mechanism 100.

Gear 93 has mounted thereon a gripping place 101 fast on shaft 83 engaging apertures 102 therein to maintain the desired torque imparted thereto by spring 84, the combination of the elements forming the motor for the clock train as a unit. The broken lines in Fig. 10 indicate one of the positions of arm 85.

When a coin is inserted in the coin pocket and the coin carrying disc 55 is rotated to the left, Fig. 8, said arm 75 is brought into contact with actuating arm 85, carrying same therewith to the position shown in Fig. 8, thus winding the torsion spring 84. Arm 75 also carries with it said gooseneck 91. When the shaft 74 is released, arm 75 returns to its normal position, thereby permitting arm 85 to move back to the gripping point of clutch 93, and also permitting said gooseneck 91 to sweep back lightly, engaging the periphery of the escapement wheel 100 and imparting thereto a starting motion. The said arm 85 having thus engaged clutch 93 comes under the control of the time mechanism, the clutch 93 allowing torsion spring 84 to drive or propel the clock train and escapement.

Fig. 8 shows the parts after arm 75 has been moved substantially 180° to the left and has then been returned nearly 180° towards its normal position. It is not all of the way back to normal position since it has not yet moved the brushes 78 away from conductor 103.

It should be noted that in this position spring brushes 78ª and 78ᵇ in Fig. 10 or 78ᶜ and 78ᵇ in Fig. 4 make contact with conductor sleeve 104ª (see Fig. 10). It should be noted that Fig. 10 is diagrammatical and that Fig. 4 contemplates that brush 78ª will be connected to the resistance 200 and brush 78ᶜ to the headphones T, whereas, Fig. 10 shows the brush 78ª connected to the phones T and brush 78ᶜ to the resistance 200.

When the proper time interval has passed and therefore said actuating arm 85 nears its normal or coin inserting position, insulating pin 88 comes in contact with the three spring brushes 78 forcing them back, looking at Fig. 4, toward the reader and thus forcing the two brushes 78ᵇ and 78ᶜ of Fig. 10 or 78ª and 78ᵇ of Fig. 4 to make contact with conductor 103 which is mounted on insulation 104. It is understood that the portions of conductor 103 shown in Fig. 4 are electrically connected.

The operation of the electrical system (see Fig. 10) is as follows:—The drum 39 has been turned by means of dial 35 so that the screw contacts 48 co-operate with the brushes of say distribution channel 3. Signal current travels through one conductor of said line 3 to one of said brushes 49, co-operating screw contact 48, then through the conductor connecting said screw 48 to its co-operating slip ring 41, co-operating brush 42 to spring contact 78ᵇ. When the system has been rendered operative by the insertion of a coin as before described and pin 88 has been moved away from spring contact devices 78 by the 180° movement of coin control handle 53 and brushes 78 have been moved down by arm 75 on its return movement, current flows from 78ᵇ through 104ª to 78ª (Fig. 10), thence through the loudspeaker or phones T to the other brush 42, then to the other slip ring 41, to the other screw contact 48, co-operating brush 42 and thence back to the other conductor of line 3. When the pin 88 is brought back to its normal position by the clockwork mechanism the spring contacts 78 are lifted, whence contact devices 78ᶜ and 78ᵇ (Fig. 10) contact with conductor 103. Current will then flow from 78ᵇ, through conductor 103, brush 78ᶜ, resistance 200 and thence back through brush 42 as before. The resistance 200 is an element of the shunting mechanism hereinbefore referred to and is made to equal, substantially, the loudspeaker or earphone resistance so that when any one vendor is cut off the others in the system will not be affected.

Arm 76 mounted on block 77 is held against arm 75 in its normal position. When arm 75 is rotated during the act of winding the clock train, the tension of spring 105 imparts a rotating motion to insulating block 77, thereby opening the circuit through the phone receivers and establishing said circuit through the resistance 200. When arm 75 is rotated in the opposite direction it engages arm 76 and moves the brushes 78 away from conductor 103 into position to be engaged by pin 88 as arm 85 moves to the right in Fig. 8 under the control of the clock work.

Referring to Figs. 11 and 12 of the drawings, the modified form of radio vendor or instrument, comprises a casing 106 having mounted thereon a coin receiving case 107, provided with a coin receiving pocket 108 and an actuating handle 109 mounted on a shaft 110, carrying on its inner end a sleeve 111, having formed therewith a stud 112 and supporting thereon a pawl 113. Shaft 110 has mounted thereon, one end of torsion spring 114 the other end thereof being fastened to pin 115 mounted in said casing 106, the object thereof being to provide means for maintaining a torque on the coin control mechanism and means for resetting the same to its normal position. The coin control mechanism as employed herein, is similar in structure and operation to that of the control involved in the general structure shown and described in Figs. 3 and 4 of the drawings. Casing 106 has formed on the base plate thereof a lug 116 arranged to receive standard arm 117, carrying at its upper end a bearing 118, and has mounted therein stud shaft 119 on one end of which ratchet gear 120 is mounted and engaged by pawl 113, the other end of said shaft 119 being rigidly secured to the time controlled float switching means 199. Said casing 106 has attached thereto a detachable plate or housing 122 having formed therein at its central portion, a bearing 123 for shaft 129. A time controlled switching means 199 is employed comprising a vertically disposed chamber 124 of cylindrical form provided at its top and bottom with sealing caps 125 and at one edge thereof with a square apertured bearing 126, adapted to receive head 121 through which it receives its tipping momentum, and at its opposite edge with a bearing 127 having mounted therein a stud 128, provided with a pin shaft 129, mounted in bearing 123 on housing plate 122 and about which said chamber turns when actuated by the coin control mechanism.

Chamber 124 contains a specific quantity of a non-conducting fluid such as oil 130 and has operative therein a negative buoyancy float 131, provided with suitable by-passes to permit said float 131 to pass therethrough to form a shorting contact head for electrodes 132 mounted in insulators 133 in the respective caps 125, thus cutting out head-set phones T. 134 indicates an insulator plate mounted in casing 106 and carries contact brushes 135 to which the respective ends of wire connections 136 are attached, said connections running to the usual head-phone T employed in systems of radio receiving units. To actuate the foregoing singularly operatable radio vendor, a coin of a certain denomination is inserted in slot of 108; handle 109 is then turned to the limit of its set movement, thereby causing pawl 113 to rotate ratchet gear 120 against the torque of spring 114, said movement causing chamber 124 to rotate a one-half turn, bringing float 131 to a position at the top of said chamber 124 in non-conducting fluid 130, at which point said float 131 being of a heavier specific gravity than the fluid 130, said float precipitates slowly downwardly therein, until it reaches approximately the bottom, where it rests upon the electrodes 132 at which point, said float 131 forms a cross contact and shorts or cuts out the head-phone T.

With reference to Fig. 13 forming part of the drawings hereof, 137 designates a railroad train made up of the usual form of coaches on cars 138 and a locomotive 139, one of the coaches thereof preferably the one next to said locomotive being provided with antenna means 140, arranged to collect or receive radio energy broadcast from transmitting stations WEAF, WJZ and WOR, whence it is carried by lead wire connection 141 to sockets 142 on the respective ends of said coaches 138 through coupling on connectors 143 to the series of receiving time controlled and coil actuated slot machine units 144 in any desired location within said coaches, and at points adjacent to the seats or chairs forming the equipment of usual and general types of passenger carrying cars. In fact, the structure involved herein may be employed in any form of movable means as well as any form of stationary means.

The operation of the general structure embodied in the invention is as follows:—

Radio energy is projected from broadcasting stations B, C, D, and E, and impinges antennæ G from which it passes to receiving sets 3, 4, 5 and 6, at which point, suitable tuning mechanism for distribution therefrom is connected to one or any number of a series of radio vendors J, K, L, and M. For the purposes of illustration, said radio vendors J, K, L, and M may be placed in a number of rooms in a hotel, hospital, or other structure, vessels, cars, etc., and connected electrically with said receiving sets. Through the broadcasting station identification means, each radio vendor may be connected up with said receiving sets, by inserting a coin of a predetermined value and size in the coin actuating mechanism 19 and turning the handle 53 and releasing it; this, in turn, permits the actuation of the time controlled mechanism 20. Said time controlled mechanism is set automatically to run for a certain duration of time, at the end of which suitable electrically controlled cut-out mechanism opens the telephone receiver circuit of that individual radio vendor, without seriously interfering with other radio vendors connected in series therewith to the receiving sets.

It is obvious that the structure and general detail formation of elements and resultant functions herein involved, may be varied both electrically and mechanically and further that the form of radio energy transformed into useful electrical energy may result in audio messages, written or printed messages, heat, light or other form of commodity divided into commercial units, without departing from the spirit of the invention.

What I claim and desire to secure by Letters Patent of the United States is:—

1. A structure of the character described comprising a series of broadcasting stations, antenna means arranged to intercept radio energy from said broadcasting stations, a primary receiving station in communication with said antenna means, a plurality of sub-receiving stations connected electrically with said primary receiving station and placed at points adjacent to or distant from said primary receiving station, time controlled means for electrically connecting said sub-receiving stations with said primary receiving station, means associated with each of said sub-receiving stations for designating the broadcasting station with which each sub-receiving station is in communication, and coin controlled means forming part of each sub-receiving station for actuating said time controlled means to electrically connect and disconnect communication between said sub-receiving stations and said primary receiving station.

2. A structure of the character described comprising a series of broadcasting stations, antenna means arranged to intercept radio energy from said broadcasting stations, a primary receiving station in communication with said antenna means, a plurality of sub-receiving stations connected electrically with said primary receiving station and placed at points adjacent to or distant from said primary receiving station, time controlled means for electrically connecting said sub-receiving stations with said primary receiving station, means associated with each of said sub-receiving stations for designating the broadcasting station with which each sub-receiving station is in communication, coin controlled means forming part of each sub-receiving station for actuating said time controlled means to electrically connect and disconnect communication between said sub-receiving stations and said primary receiving station, means forming part of each separate sub-receiving station for interrupting communication therefrom to said primary receiving station, and means forming part of each sub-receiving station for selectively connecting said sub-receiving station with any broadcasting station with which said primary receiving station is in communication.

3. A device of the character described comprising a series of radio energy broadcasting units, antenna receiving means, a primary tuning-in station comprised of separate receiving units, a secondary series of sub-receiving stations, time controlled means for electrically connecting said sub-receiving stations with said primary receiving station, coin controlled means arranged to actuate said time controlled means, and means for selectively forming a connection between said sub-receiving stations through said primary receiving station with said broadcasting stations.

4. In combination, means for simultaneous and continuous reception of radio communication from a plurality of sources, a plurality of remote substations, automatic means for transmitting said communications to each of said substations, and coin operated means locally operable by the user of each substation for making audible said communications from any of said sources for a predetermined time.

5. In combination, means for simultaneous and continuous reception of radio communication from a plurality of sources, a plurality of remote substations, automatic means for transmitting said communications to each of said substations, and coin operated means locally operable by the user of each substation for making audible said communications from any of said sources for a predetermined time, and means operated by said user to permit him to receive said communications from any other of said sources during said time.

6. In combination, apparatus of the character described including a main station for receiving radio communications, metallic means permanently connecting said main station directly with each of a plurality of remote substations, each of said substations having audio frequency indicating means and associated means operable by the user of said substation for effecting connection between said audio frequency indicating means and said main station, and automatic means actuated by said apparatus independently of manual action for thereafter effecting disconnection from the same.

7. In combination, apparatus of the character described including a main station for receiving radio communications, means connecting said main station directly with each of a plurality of remote substations, each of said substations having audio frequency indicating means and associated means operable by the user of said substation for effecting connection between said audio frequency indicating means and said main station and means independent of manual action and included in said apparatus for automatically disconnecting the same after a predetermined time interval.

8. In combination, apparatus of the character described including a series of radio energy broadcasting units, a plurality of main stations for receiving radio communications therefrom, means connecting each of said main stations directly with each of a plurality of remote substations, each of said substations including audio frequency indicating means, means for connecting said audio frequency indicating means operatively to any of said main stations, means for changing said connection to any other of said main stations and means actuated by said apparatus for thereafter automatically disconnecting said audio frequency indicating means after a predetermined time.

9. In combination, a series of radio energy broadcasting units, a plurality of main stations for receiving radio communications therefrom, means connecting each of said main stations directly with each of a plurality of remote substations, each of said substations including audio frequency indicating means, means locally operated by a coin for connecting said audio frequency indicating means operatively to any of said main stations for a predetermined time, locally operated means for changing said connection to any other of said main stations during said time, and means for automatically disconnecting said audio frequency indicating means at the expiration of said time.

10. In combination, a series of radio energy broadcasting units, a plurality of main stations for receiving radio communications therefrom, a plurality of substations remote from said main stations, trunk lines connecting each of said substations with each of said main stations, each of said substations having audio frequency indicating means and means located at said substation for connecting said audio frequency indicating means to said trunk lines for a predetermined time.

11. In combination, a series of radio energy broadcasting units, a plurality of main stations for receiving radio communications therefrom, a plurality of substations remote from said main stations, trunk lines connecting each of said substations with each of said main stations, each of said substations having audio frequency indicating means and means for connecting said audio frequency indicating means to said trunk lines for a predetermined time, and means for shifting the connection of said audio frequency indicating means from one to another of said trunk lines during said time, both of said connecting and shifting means being directly operable at each of said substations for the audio frequency indicating means there located, and means at each sub-station independent of manual operation for disconnecting said sub-station after a predetermined time.

12. In apparatus of the character described, in combination, a series of radio broadcasting units, a main station adapted to receive simultaneously diverse radio communications from a plurality of said units, a sub-station, metallic means permanently connecting said main station with said sub-station and means located at said sub-station for selecting and for making audible communications from any of said units.

13. In apparatus of the character described, in combination, a series of radio broadcasting units, a main station adapted to receive simultaneously diverse radio communications from a plurality of said units, a sub-station, metallic means permanently connecting said main station with said sub-station, means locally operable by the user of said sub-station for making audible communications from any of said units, and associated means located and operable at said sub-station whereby the user may receive instead communications from any other of said units.

14. In apparatus of the character described, in combination, a series of radio broadcasting units, a main station adapted to receive simultaneously diverse radio communications from a plurality of said units, a sub-station, metallic means permanently connecting said main station with said sub-station, and coin-operated means operable by the user of said sub-station for selecting and making audible communications from any of said units.

15. In apparatus of the character described, in combination, a series of radio broadcasting units, a main station adapted to receive simultaneously diverse radio communications from a plurality of said units, a sub-station, metallic means permanently connecting said main station with said sub-station, coin-operated means locally operable by the user of said sub-station for selecting and making audible communications from any of said units, and associated means whereby the user may receive instead communications from any other of said units.

16. In apparatus of the character described, in combination, a main station comprising a plurality of independently tuned radio receiving sets, a sub-station permanently connected by metal with each of said receiving sets and having audio frequency indicating apparatus, and means associated with and located at said sub-station for selecting and connecting said audio frequency indicating apparatus with any one of said receiving sets.

17. In apparatus of the character described, in combination, a main station comprising a plurality of radio receiving sets adapted to receive diverse communications simultaneously, a sub-station having audio apparatus, means associated with and located at said sub-station for selectively connecting said audio apparatus with any one of said receiving sets and means independent of said sub-station of tuning separately each of said receiving sets.

18. In a transportation system, a plurality of units forming a train, an antenna system and a main station associated with one of said units adapted to receive diverse radio communications from a plurality of broadcasting stations, a plurality of sub-stations located in various ones of said units, metallic means permanently connecting said main station with said sub-stations so long as the train is unbroken and means located at each of said sub-stations for selecting and for making audible communications from any of said broadcasting stations.

19. In a transportation system, a plurality of units forming a train, a main station associated with one of said units adapted to receive diverse radio communications from a plurality of broadcasting stations, a plurality of sub-stations located in various ones of said units, metallic means permanently connecting said main station with said sub-station so long as the train is unbroken, and coin operated means locally operable by the user of any of said sub-stations for selecting and making audible communications from any of said broadcasting stations.

20. In apparatus of the character described, in combination, a main station comprising a plurality of radio receiving sets adapted to receive diverse communications simultaneously, a sub-station having audio apparatus, metallic means permanently connecting said receivers at the main station with said sub-station, means located at said substation for selectively connecting said audio apparatus with any one of said receiving sets and means independent of said sub-station for tuning separately each of said receiving sets, said means associated with the sub-station including a sound reproducer, a resistance simulating that of the sound reproducer, and means for connecting the resistance and sound reproducer alternatively in circuit with a radio receiving set.

21. In apparatus of the character described, in combination, a main station comprising a plurality of radio receiving sets adapted to receive diverse communications simultaneously, a sub-station having audio apparatus, means associated with said sub-station for selectively connecting said audio apparatus with any one of said receiving sets and means independent of said sub-station for tuning separately each of said receiving sets, the means associated with the sub-station including a sound reproducer, electrical conductors connected respectively to each of the receiving sets, a resistance associated with each of said receiving sets and its respective conductors, and means for connecting the resistance and sound reproducer alternatively in series with a receiving set.

22. In apparatus of the character described, in combination, a main station comprising a plurality of radio receiving sets adapted to receive diverse communications simultaneously, a sub-station having audio apparatus, means associated with said sub-station for selectively connecting said audio apparatus with any one of said receiving sets and means independent of said sub-station for tuning separately each of said receiving sets, said means associated with the sub-station including a sound reproducer, electrical conductors connected respectively to each of the receiving sets, a resistance simulating that of the sound reproducer, and means for connecting the resistance and sound reproducer alternatively in circuit with a radio receiving set, and said last-mentioned means being constructed to maintain either the sound reproducer or the resistance in circuit at all times.

23. In apparatus of the character described, in combination, a main station comprising a plurality of radio receiving sets adapted to receive diverse communications simultaneously, a sub-station having audio apparatus, means associated with said sub-station for selectively connecting said audio apparatus with any one of said receiving sets and means independent of said sub-station for tuning separately each of said receiving sets, the means associated with the sub-station including a sound reproducer, electrical conductors connected respectively to each of the receiving sets, a resistance, contacts operable alternatively to connect the sound reproducer with the radio receiving set and to connect the resistance with the receiving set in place of the sound reproducer, clock mechanism, means operable on movement in one direction to set the clock mechanism and on movement in another direction to cause the above-mentioned contacts to make the sound reproducer effective, and means operable by the clock mechanism at the end of a predetermined period to operate the contacts to cause the sound reproducer to be disconnected from the receiving set and the resistance to be connected thereto.

24. In apparatus of the character described, in combination, a main station comprising a plurality of radio receiving sets adapted to receive diverse communications simultaneously, a sub-station having audio apparatus, means associated with said sub-station for selectively connecting said audio apparatus with any one of said receiving sets and means independent of said sub-station for tuning separately each of said receiving sets, the means associated with the sub-station including a sound reproducer, contacts adapted to connect the sound reproducer with a radio receiving set, clock mechanism, a rotatable member normally locked against movement, an arm operable on movement of said member in one direction to set the clock mechanism and on movement in another direction to cause the above-mentioned contacts to make the sound reproducer effective, means operable by the clock mechanism at the end of a predetermined period to operate the contacts to cause the sound reproducer to be disconnected from the receiving set, and coin-controlled means for releasing the rotatable member to permit movement in said first direction.

25. In apparatus of the character described, in combination, a main station comprising a plurality of radio receiving sets adapted to receive diverse communications simultaneously, a sub-station having audio apparatus, means associated with said sub-station for selectively connecting said audio apparatus with any one of said receiving sets and means independent of said sub-station for tuning separately each of said receiving sets, the means associated with the sub-station including a sound reproducer, contacts adapted to connect the sound reproducer with a radio receiving set, clock mechanism, means operable on movement in one direction to set the clock mechanism and on movement in another direction to cause the above-mentioned contacts to make the sound reproducer effective, and means operable by the clock mechanism at the end of a predetermined period to operate the contacts to cause the sound reproducer to be disconnected from the receiving set.

26. In a centralized radio system, a central station including a plurality of radio receivers, each receiver including a means for tuning it to a desired broadcasting station, antenna means connected to each of said receivers, a plurality of remote, spaced electrical reproducers, certain of the reproducers being of the head set type, a distributing network for transmitting the output of any of said receivers to said reproducers, a station selector mechanism located at each of said reproducers comprising a switch electrically connected to said network and adapted to be actuated to select for reproduction the program of a desired broadcasting station.

27. In a centralized radio system, a central station including a plurality of radio receivers, each receiver including a means for tuning it to a desired broadcasting station and a demodulating means for transforming the received signals to audio frequency impulses, a plurality of remote, sub-stations, each sub-station including a reproducer, separate lines between each of said receivers and each sub-station for distributing the impulses from each receiver, and a station selector mechanism located at each sub-station comprising a switch electrically connected to each reproducer and adapted to be actuated to selectively associate a reproducer with a desired one of said separate lines.

In testimony whereof I affix my signature.
LAWRENCE W. LUELLEN.